(12) United States Patent
Eckel et al.

(10) Patent No.: US 10,678,939 B2
(45) Date of Patent: Jun. 9, 2020

(54) DIGITAL IDENTIFICATION ENROLLMENT (71) Applicant: MorphoTrust USA, LLC, Billerica, MA (US)

(72) Inventors: Robert Andrew Eckel, Andover, MA (US); A. David Kelts, Arlington, MA (US)

(73) Assignee: MorphoTrust USA, LLC, Billerica, MA (US)

( * ) Notice: Subject to any disclaimer, the term of this patent is extended or adjusted under 35 U.S.C. 154(b) by 0 days.

(21) Appl. No.: 16/042,842

(22) Filed: Jul. 23, 2018

(65) Prior Publication Data
US 2018/0349630 A1 Dec. 6, 2018

Related U.S. Application Data (63) Continuation of application No. 14/964,215, filed on Dec. 9, 2015, now Pat. No. 10,032,042.
(Continued)

(51) Int. Cl.
G06F 21/31 (2013.01)
G06F 21/62 (2013.01)
G06Q 30/00 (2012.01)
H04L 29/08 (2006.01)
G06F 21/33 (2013.01)
(Continued)

(52) U.S. Cl.
CPC .......... *G06F 21/6218* (2013.01); *G06F 21/31* (2013.01); *G06F 21/32* (2013.01); *G06F 21/33* (2013.01); *G06F 21/34* (2013.01); *G06Q 30/018* (2013.01); *H04L 67/306* (2013.01)

(58) Field of Classification Search
None
See application file for complete search history.

(56) References Cited

U.S. PATENT DOCUMENTS 6,341,169 B1 * 1/2002 Cadorette, Jr. ........ G06Q 20/04
340/5.8
2004/0213437 A1 * 10/2004 Howard ............. G06K 9/00248
382/115
(Continued)

OTHER PUBLICATIONS

Match-on-Card for Secure and Scalable Biometric Authentication. Bergman, Christer. (Year: 2008).*
(Continued)

*Primary Examiner* — Venkat Perungavoor
(74) *Attorney, Agent, or Firm* — Fish & Richardson P.C.

(57) ABSTRACT

In some implementations, a computer-implemented method and system for enrolling customers into a digital identification program may include obtaining, from a digital identification database, customer information that describes a customer, providing to the customer device an access code for activation, receiving a request from the customer device for the digital identification, where the request includes the access code and customer information that describes the customer, providing a request for secure information that describes the customer from a secure information database, receiving the secure information that describes the customer stored in the secure information database, generating the digital identification for the customer based on the secure information and the customer information, and providing the digital identification to the customer device.

20 Claims, 6 Drawing Sheets

Related U.S. Application Data (60) Provisional application No. 62/090,348, filed on Dec. 10, 2014.

(51) Int. Cl.
  *G06F 21/34* (2013.01)
  *G06F 21/32* (2013.01)
  *G06F 21/36* (2013.01)

(56) References Cited

U.S. PATENT DOCUMENTS

| | | | | |
|---|---|---|---|---|
| 2004/0258281 | A1* | 12/2004 | Delgrosso | G06K 9/00973 382/115 |
| 2005/0224573 | A1* | 10/2005 | Yoshizane | G06F 21/32 235/379 |
| 2007/0261114 | A1 | 11/2007 | Pomerantsev | |
| 2012/0106805 | A1* | 5/2012 | Shuster | G06K 9/00912 382/115 |
| 2012/0250950 | A1* | 10/2012 | Papakipos | G06K 9/00677 382/118 |
| 2013/0007874 | A1* | 1/2013 | Purvis | G06F 21/31 726/19 |
| 2013/0340058 | A1* | 12/2013 | Barnes | G06F 21/32 726/6 |
| 2014/0244510 | A1 | 8/2014 | De Beasley | |
| 2015/0039451 | A1* | 2/2015 | Bonfiglio | G06Q 50/12 705/15 |
| 2016/0180150 | A1* | 6/2016 | Negi | G06F 16/51 382/118 |
| 2016/0269379 | A1* | 9/2016 | Livesay | G06K 9/00288 |
| 2018/0107880 | A1* | 4/2018 | Danielsson | G06T 7/292 |

OTHER PUBLICATIONS

Chapter 16. Face Recognition Applications. Haung et al. (Year: 2005).*
Facial Verifications Technology for Use in ATM Transactions. Eze et al. (Year: 2013).*
KR 1087698. English Translation. (Year: 2011).*
KR10171389. English Translation. (Year: 2017).*
Modelling and Information Fusion in Digital Identity Managment Systems. Phiri et al. IEEE (2006).

* cited by examiner

DIGITAL IDENTIFICATION ENROLLMENT

CROSS-REFERENCE TO RELATED APPLICATIONS

This application is a continuation of allowed U.S. patent application Ser. No. 14/964,215, filed Dec. 9, 2015, which claims priority to U.S. Provisional Application Ser. No. 62/090,348, filed on Dec. 10, 2014.

FIELD

The present specification is related generally to digital identifications.

BACKGROUND

Physical identification cards such as driver licenses are commonly used for verifying the identity of an individual, providing access to restricted areas, or authorizing an individual to purchase age-restricted content.

SUMMARY

Physical identification cards are provided by issuing authorities such as government agencies or companies to customers during an issuance process. Such physical identification cards include customer information that is used to identify the identity of the customer, and in some instances, provide access or privileges to the customer. However, because security features included in physical identification cards are often preset during the issuance process, customers are often susceptible to risk of fraud and counterfeiting when the preset security features are compromised. Additionally, if a customer's information changes, e.g., residence address, the customer may need to wait for a new physical identification card to be printed and mailed to the customer.

Accordingly, one innovative aspect of the subject matter described in this specification may include a computer-implemented method for an enrollment process for provisioning digital identifications for customers. For instance, a digital identification may be provisioned to enable customers to carry and present digital forms of a physical identification on a portable electronic device. The digital identification may additionally be configured to an application infrastructure that includes a digital identification server that stores customer information, an issuing authority that stores secure customer information included in a physical identification card, and a customer device that displays and provides access to the digital identification. In some instances, the digital identification may include multiple security and anti-counterfeiting features to protect the customer information included in the digital identification against fraud and identity theft.

Implementations may include one or more of the following features. For example, computer-implemented methods may include provisioning a digital identification on a customer device. The computer-implemented methods may include obtaining, from a digital identification database, customer information that describes a customer, providing to the customer device an access code for activation, receiving a request from the customer device for the digital identification that includes the access code and customer information, determining that describing the customer, determining that the access code in the received request matches the access code for activation provided to the customer device and that the customer information from the customer device matches the customer information that describes the customer obtained from the digital identification database, in response to determining that the access code in the received request matches the access code for activation provided to the customer device and that the customer information entered by the customer matches the customer information that describes the customer obtained from the digital identification database, providing a request for secure information that describes the customer from a secure information database, receiving the secure information that describes the customer stored in the secure information database, generating the digital identification for the customer based on the secure information and the customer information, and providing the digital identification to the customer device.

Other versions include corresponding systems, and computer programs, configured to perform the actions of the methods encoded on computer storage devices.

One or more implementations may include the following optional features. For example, in some implementations, the secure information that describes the customer stored in the secure information database includes demographic information associated with the customer and a portrait image of the customer.

In some implementations, providing the digital identification to the customer device includes providing an access credential associated with the digital identification.

In some implementations, providing to the customer device the access code for activation includes providing a deeplink that directs the customer to install a digital identification application on the customer device.

In some implementations, receiving the request from the customer device for the digital identification includes receiving one or more images of a physical identification from the customer device, and identifying, based on using an optical character recognition technique on the one or more images of the physical identification, customer information that describes the customer.

In some implementations, generating the digital identification for the customer includes determining that the identified customer information that describes the customer from the one or more images of the physical identification matches the secure information that describes the customer stored in the secure information databases, and in response, generating the digital identification for the customer.

In some implementations, the computer-implemented method may include: deciding to provide a customer device associated with the customer a digital identification for the customer, where providing to the customer device the access code for activation is in response to deciding to provide the customer device associated with the customer the digital identification for the customer.

The details of one or more implementations are set forth in the accompanying drawings and the description below. Other potential features and advantages will become apparent from the description, the drawings, and the claims.

Other implementations of these aspects include corresponding systems, apparatus and computer programs, configured to perform the actions of the methods, encoded on computer storage devices.

BRIEF DESCRIPTION OF THE DRAWINGS

In the drawings, like reference numbers represent corresponding parts throughout.

DETAILED DESCRIPTION

In general, this specification describes methods and systems for provisioning digital identifications for customers. For instance, a digital identification may be complementary to a physical identification card and provided on a portable electronic device, enabling customers to carry and display digital forms of physical identification cards on the portable electronic device. In some instances, the digital identification may include multiple security protocols to protect customer information against fraud and counterfeiting.

A "customer" may refer to a user or individual. For example, a customer may be an individual with a physical identification card that may be a driver's license issued by a department of motor vehicles of a territory or a municipality. In other instances, the identification card may be other types of identifications such as a social security card, a passport, a birth certificate, or other government or company-issued identification cards.

A customer may be provided with a digital identification by enrolling into a digital identification program offered by a digital identification administrator. In some instances, the digital identification administrator may also be the issuing authority. In other instances, the digital identification administrator may be another organization that is authorized by the issuing authority to manage the issuance and maintenance of digital identifications.

A customer may opt to enroll into the digital identification program using various methods such as, for example, an online enrollment process, a form submission, an automated provisioning by an issuing authority, or through an oral agreement with an authorized representative. The digital identification server may then create a customer entry including customer information in a digital identification database. For instance, the customer information may include one or more of an email address, a mobile number, an identification number, a customer photograph, and other types of demographic information (e.g., home address) associated with the customer. The digital identification database may also indicate to the digital identification administrator that an entry for the customer has been successfully created once the entry for the customer has been created.

The enrollment process for the digital identification program may include the use of various methods to receive customer information, such as, for example, the use of email or mobile communication, the use of a secret provided directly to the customer such as a personal identification number (PIN), and/or the use of customer biometric parameters to match to those on file with the issuing authority.

Figure 1A:
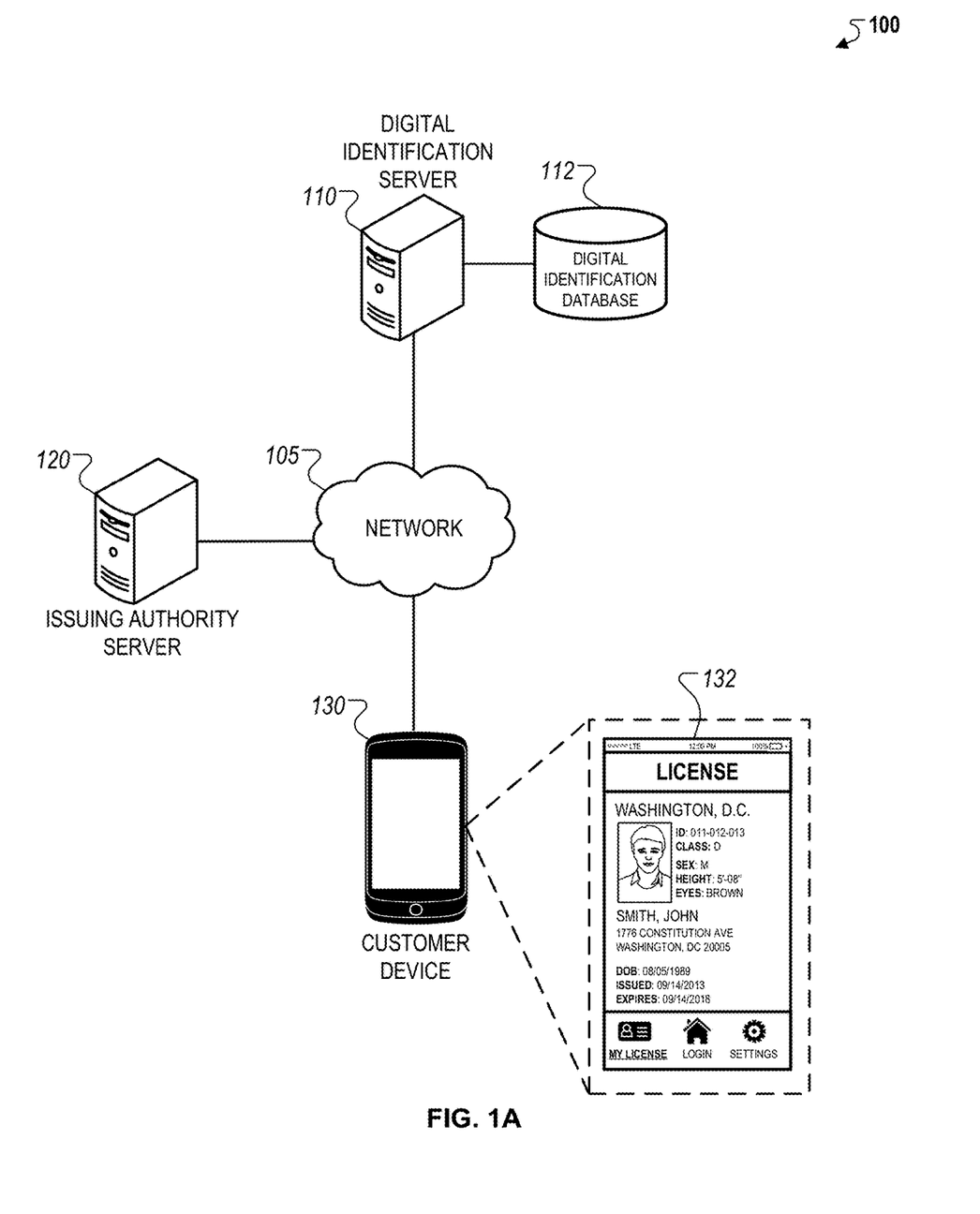
FIG. 1A illustrates a block diagram of an example system for providing digital identifications to a customer device.

FIG. 1A illustrates exemplary architecture for a system 100 for provisioning a digital identification 132 for a customer. In general, the system 100 may be used for various processes associated with a digital identification 132. For instance, the system 100 may be used to initially enroll customers into a digital identification program, and provision a digital identification 132 to enrolled customers.

Briefly, the system 100 may include a digital identification server 110, an issuing authority server 120, and a customer device 130 connected over a network 105. The digital identification server 110 may also be configured to exchange communications with a digital identification database 112. In addition, the customer device 130 may display a digital identification 132 on a user interface presented to a user (e.g., a customer or any other authorized user) on the customer device 130. Although the digital identification 132 is depicted as a digital driver license in FIG. 1A, the digital identification 132 may alternatively be a digital form of any physical identification card issued to a customer from various types of identification issuing authorities (e.g., a government agency or a company). The digital identification 132 may also include a feature of being usable as an online account for authentication to web sites. In some implementations, the button shown on the user interface of the customer device 130 labeled "HOME" may instead be a button labeled "LOGIN" that enables a user to select the button to choose from one or more websites to log into an account of the user using the digital identification 132. For example, the digital identification 132 may receive a selection of login, present a list of websites, receive a selection of a particular website, and in response, provide the website information from the digital identification 132 that authenticates the user as the user associated with the account on the website.

The system 100 may be used to periodically assign and update a security status associated with the digital identification 132 of each enrolled customer. The security status associated with the digital identification 132 may be a set of configuration settings that control the digital identification 132. In some implementations, the security status may specify different sets of customer credential data to be used under different conditions, and the customer device 130 may update the security status based on information from the digital identification server 110.

For example, a security status received by a customer device 130 from the digital identification server 110 may specify that when the digital identification 132 is displayed on the customer device 130 on a Monday, the digital identification 132 include a first credential data, and when the digital identification 132 is displayed on the customer device 130 on a Tuesday, the digital identification 132 include a different, second credential data. Credential data may refer to information that is used to verify validity of customer information. For example, credential data may include a particular image, a particular verification phrase, or a checksum of customer information calculated with a particular checksum algorithm.

In another example, the security status may be used by the digital identification server 110 to indicate on the customer device 130 whether the digital identification 132 is "valid" or "invalid" based on a verification procedure performed by the digital identification server 110. In other examples, the security status may variably include a set of customer credential data associated with the digital identification 132 over a particular period of time. The customer credential data may refer to customer-specific information used to verify the authenticity of the digital identification 132 and/or prevent fraudulent or unauthorized access of the digital identification 132. For instance, as described more particularly in FIG. 1B, the customer credential data may be used with various security level protocols of the digital identification 132 where each level uses a different set of credential data and different detection techniques to identify the credential data for use in the verification of the digital identification 132.

In yet another example, the security status may be used by the digital identification server 110 to generate different representations of the digital identification 132 on the customer device 130 based on the GPS location of the customer device 130. In still another example, the security status may be used to adjust the access to specific information in the digital identification 132 based on the particular application of use (e.g., identity verification, age-restricted product access, etc.).

In addition, the system 100 may use a set of dynamic security protocols to protect customer information included in the digital identifications 132 of enrolled customers, and verify the authenticity of the digital identification 132. As described more particularly with respect to FIG. 1B, the set of dynamic security protocols may describe various security protocols implemented by the digital identification server 110 using different types of variable customer credential data, and detection techniques to perform a verification operation of the variable customer credential data. For instance, the set of dynamic security protocols may be associated with "levels" that represent different protocol complexities, and different detection techniques of the variable customer credential data. For example, level one security protocols may represent a protocol for verification that uses simpler credential data that may be more easily detectable by the human eye, whereas level three security protocols may represent a protocol for verification that uses complex credential data that may be encrypted and require the use of a detector device and a distributed private decryption key.

In more detail, the network 105 may be configured to enable electronic communications between the digital identification server 110, the issuing authority server 120, and the customer device 130. For instance, the network 105 may include Local Area Networks (LANs), wide area networks (WANs), Wi-Fi, or analog or digital wired and wireless networks. The network 105 may include multiple networks or subnetworks, each of which may include, for example, a wired or wireless data pathway. The network 105 may also include a circuit-switched network, a packet-switched data network, or any network capable of carrying electronic communications (e.g., data or voice communications). For example, the network 105 may include networks based on the Internet Protocol (IP), or other comparable technologies.

The digital identification server 110 may be a remote server that is monitored and operated by an organization or institution that is authorized by an identification issuing authority to provide the digital identification 132 to a customer. In some instances, the organization or institution operating the digital identification server 110 may be an organization that is designated by the identification issuing authority to access identification information for a plurality of customers who have been issued a physical identification card. In other instances, the organization or institution operating the digital identification server 110 may be the identification issuing authority (e.g., a government institution) that issues a plurality of customers with a physical identification card.

The digital identification server 110 may coordinate and administer the backend processes that are involved in provisioning a digital identification to the plurality of customers that have been issued a physical identification from the identification issuing authority. For instance, the digital identification server 110 may initiate processes to enroll customers with the digital identification 132, and operate security protocols to detect potential fraudulent use or privacy breaches associated with the digital identifications. In some instances, the processes related to the digital identification 132, as described above, may be coordinated with the issuing authority server 120, to ensure that secure customer information that includes personally identifiable information are not exposed during the provisioning of the digital identification 132. In still other instances, the customer may initiate on the customer device 130 processes for the provisioning of a digital identification by providing customer information to the digital identification server 110 that is compared with customer information of record on the issuing authority server 120 to provision the digital identification.

As described, secure customer information may refer to customer information within the digital identification 132 that may include personally identifiable information associated with the customer such as, for example, social security numbers, driver license numbers, place of residence, and/or other demographic information that is associated with other types of information that the customer considers private. Access to the secure customer information within the digital identification 132 may be restricted by the digital identification server 110 by the using particular authorization procedures (e.g., requiring of customer access codes) to access the secure information on the client device 130.

The digital identification server 110 may exchange communications with the digital identification database 112, which includes customer information for enrolled customers and/or other configuration details related to the digital identification program. For instance, the digital identification database 112 may include a customer entry associated with a customer that includes account information associated with enrolled customers, and any type of customer information that may be provided by the customer during a digital identification enrollment process. The digital identification database 112 may also include customer information or cryptographic representations of customer information used for verification of personally identifiable information associated with a customer.

In some implementations, the digital identification database 112 may include customer entries for both customers that are enrolled in the digital identification program and potential customers that the digital identification server 110 has identified as customers that are likely to enroll in the digital identification program. For example, the digital identification database 112 may include a field that indicates whether a customer entry is associated with an enrolled customer or a potential customer. In such implementations, the digital identification database 112 may be accessed by the digital identification server 110 to retrieve customer information for the digital identification 132 associated with an enrolled customer, and customer information for a candidate customer in order to send an enrollment email that provides an enrollment code to the candidate customer.

In some implementations, the customer entry for enrolled customers may be automatically created by the digital identification server 110 within the digital identification database 112. In such implementations, the customer may submit an online enrollment form including a set of user fields for providing customer information. In response, the digital identification server 110 may initiate a computer-implemented procedure that automatically generates a customer entry for the customer in the digital identification database 112 and inserts the values submitted for the set of user fields as customer information that is included in the customer entry. These values may then be verified at the issuing authority server prior to provisioning of the digital identification 132.

In addition, the digital identification database 112 may include security status information associated with the digital identification 132, which is accessed by the digital identification server to assign a security status to the digital identification 132 at particular time periods. For instance, the security status information may specify a set of customer credential data to be included in the digital identification 132, and a timestamp associated when each customer credential data indicating when the data was generated by the digital identification server 110. In one example, the security status information may specify the values of customer credential data such as access codes or customer-selected authentication mechanisms associated for the digital identification 132. In another example, the security status information may specify configurations for executing the security protocols to verify the digital identification 132.

In yet another example, the security status information may include a set of instruction files that may be transmitted to customer devices to periodically backup customer data included in digital identifications 132 and/or enable separate detector devices to verify the digital identification 132 that is displayed on a customer device.

In some implementations, the digital identification server 110 may additionally exchange communications with an image server which stores photographs associated with a customer identification card. In some implementations, the image server may be operated by a separate entity or organization that operates the digital identification server 110. For instance, in such implementations, the image server may be operated by the identification issuing authority. In other implementations, the image server may be operated by the authorized issuing authority that also operates the digital identification server 110. In such implementations, the image server may be a sub-component of the digital identification server 110.

The issuing authority server 120 may be a remote server that is operated by the issuing authority and used to control access to secure customer information that is included in physical identification cards issued by the issuing authority. For instance, the issuing authority server 120 may provide access to demographic information of customers, historical information associated with customers (e.g., previous identification cards issued, number of renewals, etc.), and/or other types of customer information using authorization procedures that require validation of access credentials. For example, upon receiving a request for the secure customer information by the digital identification server 110, the issuing authority server 120 may require an exchange of the access credentials to validate an authorized request.

In some implementations, the issuing authority server 120 may contain verification workflows that provide for the comparison of demographic and biometric data to customer-submitted attributes such that the data and images within the customer record remain in possession of the issuing authority yet the verification of data authorizes the provisioning of the digital identification.

The issuing authority server 120 may be queried by the digital identification server 110 for secure customer information during a digital identification operation. For instance, during an enrollment process, after a customer has opted to enroll into a digital identification program, the digital identification server 110 may query the issuing authority server 120 using a customer identifier number to extract secure customer information to be included in a generated digital identification 132. In another example, during a verification operation, the digital identification server 110 may access the issuing authority server 120 to determine whether a digital identification 132 for a customer includes false customer information indicative of a fraudulent digital identification 132. In other implementations, the issuing authority server 120 may execute verification workflows that permit the accuracy of digital identifications or customer-submitted information to be verified without the customer information of record leaving the issuing authority.

In some implementations, the issuing authority server 120 may be configured with additional security protocols compared to the digital identity server 110 to protect sensitive customer information associated with the customer. For instance, in some instances, the issuing authority server 120 may be associated with a Federal government agency that manages nationwide programs that require specialized access (e.g., a government clearance). In such instances, the digital identification server 110 may be configured to access the secure customer information stored within the issuing authority server 120 under a special security agreement that ensures that the exchange of the secure customer information is controlled and regulated according to Federal privacy statutes. For example, the issuing authority server 120 may track information related to each exchange with the digital identification server 110 such that in the event that the digital identification server 110 determines that a particular digital identification 130 is invalid, a notification may be received by the issuing authority server 120 to take additional security measures to protect more sensitive customer information that may be associated with, but not included in, the digital identification 132. In this regard, the communication exchange between the digital identification server 110 and the issuing authority server 120 may be utilized to ensure protection of customer information beyond the customer information included in the digital identification 132.

The customer device 130 may be a portable electronic computing device that displays the digital identification 132 associated with a customer. For instance, the customer device 130 may be, for example, a smart phone, a tablet computer, a laptop computer, a personal digital assistant device, an electronic pad, a smart watch, a smart glass, or any personal electronic device with a display that is connected to a network or connected to another device that is connected to a network.

The customer device 130 exchanges communications with the digital identification server 110 to receive and transmit enrollment information related to the digital identification program, customer data that is included in the digital identification, credential data used to verify the authenticity of the digital identification 132, and/or configuration settings that adjust the display of the digital identification 132 on the customer device 130. For example, during an online enrollment process, the customer may use the customer device 130 to input customer information or derive customer information from a physical identification card and enter an assigned access code for the digital identification program, which is then transmitted to the digital identification server 110 to generate the digital identification 132. In another example, during a verification process, when the digital identification 132 is enabled on the customer device 130, a data packet including credential data may be transmitted to the digital identification server 110 to determine whether the digital identification 132 is still valid or includes accurate information. In this example, if the digital identification server 110 determines that the credential data is valid, then the digital identification may be determined to be valid. Alternatively, if the digital identification server 110 determines that the credential data is not valid, then the digital identification 132 may be determined to be invalid.

In some implementations, the customer device 130 may include a mobile application that exchanges communications to the digital identification server 110 as an application server. For example, the mobile application may be associated with a customer account that is stored on the digital identification database 112. In addition, the mobile application may periodically exchange information related to the security status assigned by the digital identification server 110 to determine whether the digital identification 132 is valid. In some instances, the mobile application may additionally or alternatively include various displays of the digital application such that the mobile application may be used as a replacement form of identification to a physical identification card.

The digital identification 132 may be displayed on a user interface on the customer device 130. For example, as shown in FIG. 1A, the digital identification 132 may include a photograph of a customer, a customer identifier, categorical data (e.g., identification classification), demographic information (e.g., sex, height, eye color, home address), date of birth, etc.), and issuance information associated with a corresponding physical identification card. In some instances, the digital identification may be a digital image of the corresponding physical identification card. In such implementations, the appearance of the digital identification may be substantially similar to the physical identification and consequently used as a duplicate form of identification.

In some implementations, the digital identification 132 may include one or more dynamic security protocols that utilize customer credential data to verify and validate the digital identification 132. For instance, the digital identification 132 may include customer credential data that include a set of visual indicators such as, for example, pattern overlays, holograms, kinetograms, or other types of graphical information that are visually detectable by human eyes. In other instances, the digital identification 132 may include customer credential data that include a set of indicators that may not be detectable by human eyes but are optically detectable by a detector device that is capable of using light detection and manipulation techniques to extract information related to the set of indicators.

In addition, customer credential data may be included in the digital identification 132 based on an assigned security state to the digital identification 132. For example, the security state may designate an expected customer credential within the digital identification 132, such that either an authorized user (e.g., a law enforcement officer, or other individual using the digital identification to verify the identity of the customer) or a detector device may compare a security feature displayed on the digital identification to the expected security feature to determine if the digital identification 132 is accurate and verified.

Figure 1B:
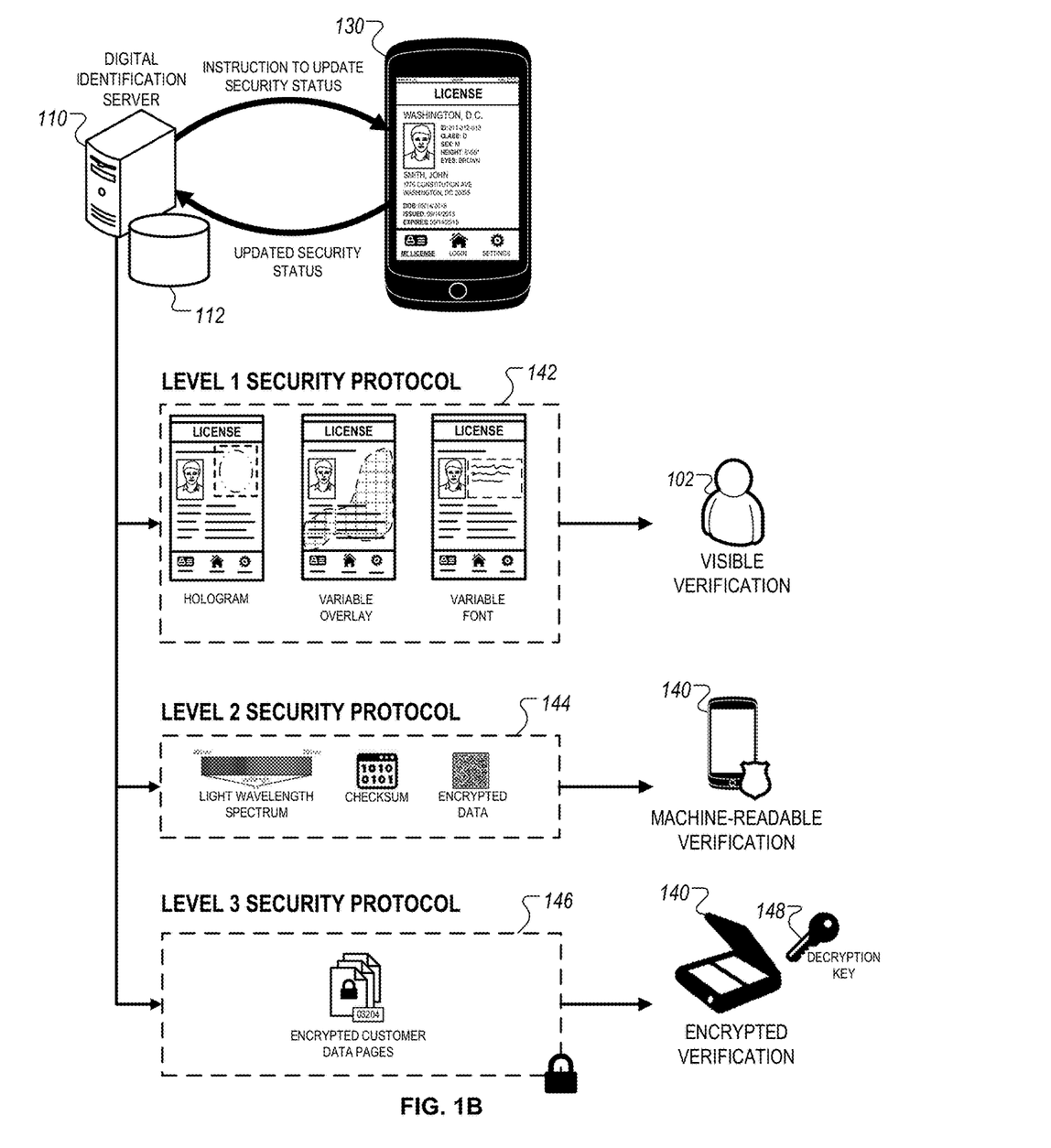
FIG. 1B illustrates example security protocols of a digital identification.

FIG. 1B illustrates exemplary security features of a digital identification. In general, the digital identification server 110 and the customer device 130 may regularly exchange communications to update the security status of the digital identification 132. For instance, the digital identification server 110 may transmit an instruction to update the security status with one or more customer credential data to the customer device 130 and the customer device 130 may transmit information related to usage of the digital identification 132 to the digital identification server 110, which may then update the customer entry in the digital identification database 112.

The digital identification server 110 may implement different levels of security features to protect customer information in the digital identification 132 against fraud and counterfeiting. For instance, as shown in FIG. 1B, the digital identification server 110 may implement a set of level one features 142, a set of level two features 144, and a set of level three features 146.

In general, the level one security protocols 142 may include visible indicators that are displayed on the digital identification 132 such that the visible indicators are detectable by human eyes. For instance, the visible indicators displayed on the digital identification 132 may be visually detected by an authorized user 102 (e.g., security personnel outside a restricted area, a law enforcement officer, etc.) and verified against an expected visual indicator for the digital identification 132.

In some implementations, the level one security protocols 142 may include a three dimensional rotating photo of the customer that rotates from left to right in a rendered composite image. In another example, the level one security protocols 142 may include a floating variable overlay that includes a hologram simulation layer that is updated based on the security status designated by the digital identification server 110. In another example, the level one security protocols 142 may include a variable virtual backdrop that is cycled randomly based on display instructions from the digital identification server 110. For instance, the variable virtual backdrop may include a specified background pattern that is displayed on the digital identification 132.

In some implementations, the level one security protocols 142 may include variable graphic or font alterations that are adjusted based on a set of time-specific or condition-specific patterns designated by the digital identification server 110. For instance, the graphical or font alterations displayed on the digital identification 132 (e.g., text font, text color, logos or patterns) may be adjusted based on a set of instructions transmitted from the digital identification server 110 to the customer device 130. In some instances, the one or more alterations may be implemented randomly from a list of available alterations included in the instructed transmitted from the digital identification server 110. In other instances, sets of alterations may be grouped together to generate different visual patterns based on a particular verification operation to be performed using the digital identification 132.

Level two security protocols 144 may include customer credential data, included within the digital identification 132, that are visually imperceptible to humans but detectable with the use of a detector device 140. For instance, the detector device 140 may use optical scanning techniques to detect the customer credential data, digital processing techniques to extract embedded data payloads, pattern recognition techniques to detect displayed patterns (e.g., QR codes), or other common forms of data authentication techniques employed in secure transactions.

In some instances, the detector device 140 may be capable of performing machine recognition techniques such as, for example, optical character recognition, optical word recognition, intelligent character recognition, or other forms of pattern recognition to identify features of interest within a captured image of the digital identification 132. In such instances, the detector device 140 may initially receive a pre-processed image of the digital identification 132, and then receive trained pattern data indicating the features of interest from the digital identification server 110. Using the trained pattern data, the detector device 140 may then recognize the features within the pre-processed image of the digital identification 132 based on performing machine recognition techniques.

In some implementations, the level two security protocols 144 may include multiple layers that are detectable to the detector device 140. For instance, the layers may either include different sets of graphical information, or a subset of graphical information associated with an overall graphic associated with customer credential data. For example, the graphic information may include variable art, variable font, microprint, variable hologram overlays, or combinations of the different graphical information. In such implementations, the detector device 140 may receive a set of instructions from the digital identification 132 to extract individual layers based on the use of visual filters to deselect layers of interest that may include customer credential data. In other examples, other light manipulations techniques may be applied to one or more of the layers to analyze the graphical information of the indicators within the digital identification 132.

In some implementations, the level two security protocols 144 may include rendering customer credential data from customer information within the digital identification 132. For instance, the digital information may include encrypted payloads with demographic and portrait data of the customer associated with the digital identification 132, information related to the security status of the digital identification 132, or other types of encoded information. In other instances, the digital information may include a quick response (QR) code that is provided to the detector device, and used to retrieve customer information. In other instances, the rendered customer credential data may include customer-unique audio watermarks (e.g., an audible message) or set of audio tones that may be provided to the detector device 140 for verification.

The level three security protocols 146 may include encrypted customer data pages that include secure customer information from the digital identification 132. For instance, customer data generated on the customer device 130 may be periodically transferred to the digital identification server 110 to update the security state and/or maintain updated credential information associated with the customer. The digital identification server 110 may encrypt the customer data pages generated on the customer device 130 using a rotating random key maintained and updated by the digital identification server 110. The encrypted customer data pages may additionally be provided to the detector device along with a decryption key 148 to enable the detector device 140 to decrypt the encrypted customer data pages and extract decrypted data payloads that include secure customer information.

In some implementations, the level three security protocols 146 may include the use of a variable checksum associated with the encrypted customer data pages to verify the secure information included in the encrypted customer data pages. For instance, the variable checksum may include a timestamp that is used to identify when the security status of a particular data page was last updated by the digital identification server 110. The timestamp in the variable checksum may then be cross-referenced against the last identified checksum within the digital identification database 112 to determine if the particular encrypted data page reflects updated customer information according to the most recent security status designated by the digital identification server 110.

Figure 2A:
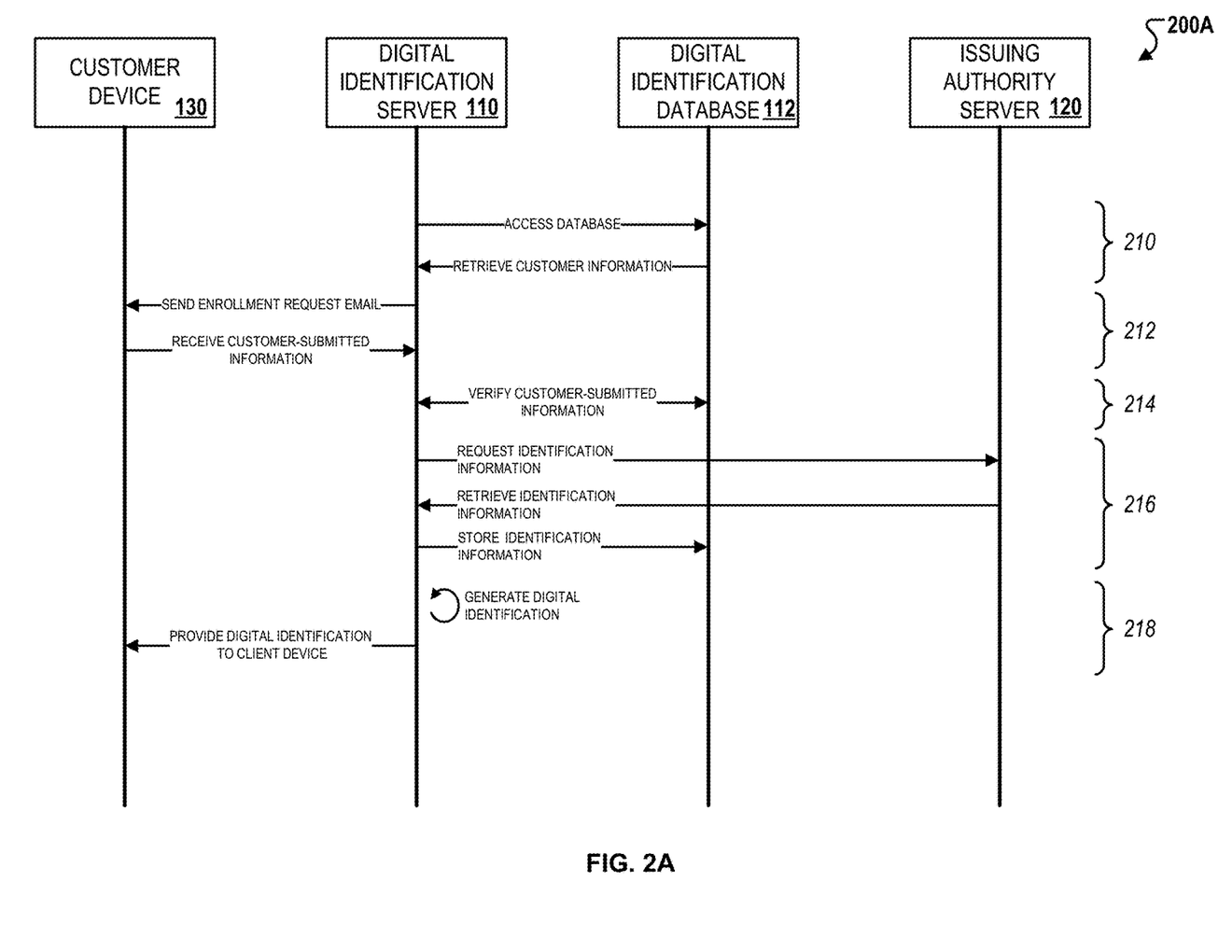
FIGS. 2A-2C illustrates swim lane sequence diagrams of example digital identification enrollment processes.
Figure 2B:
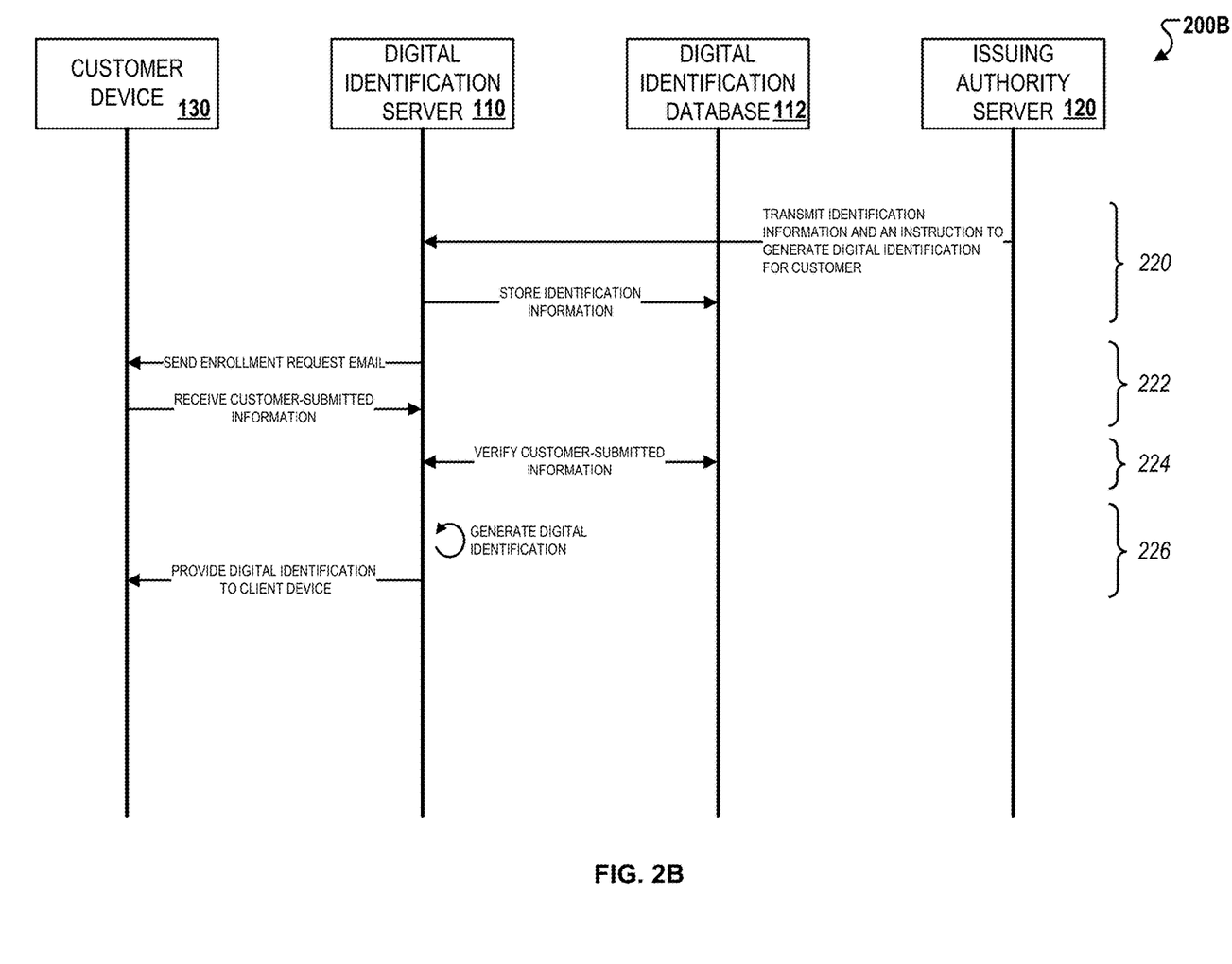
Figure 2C:
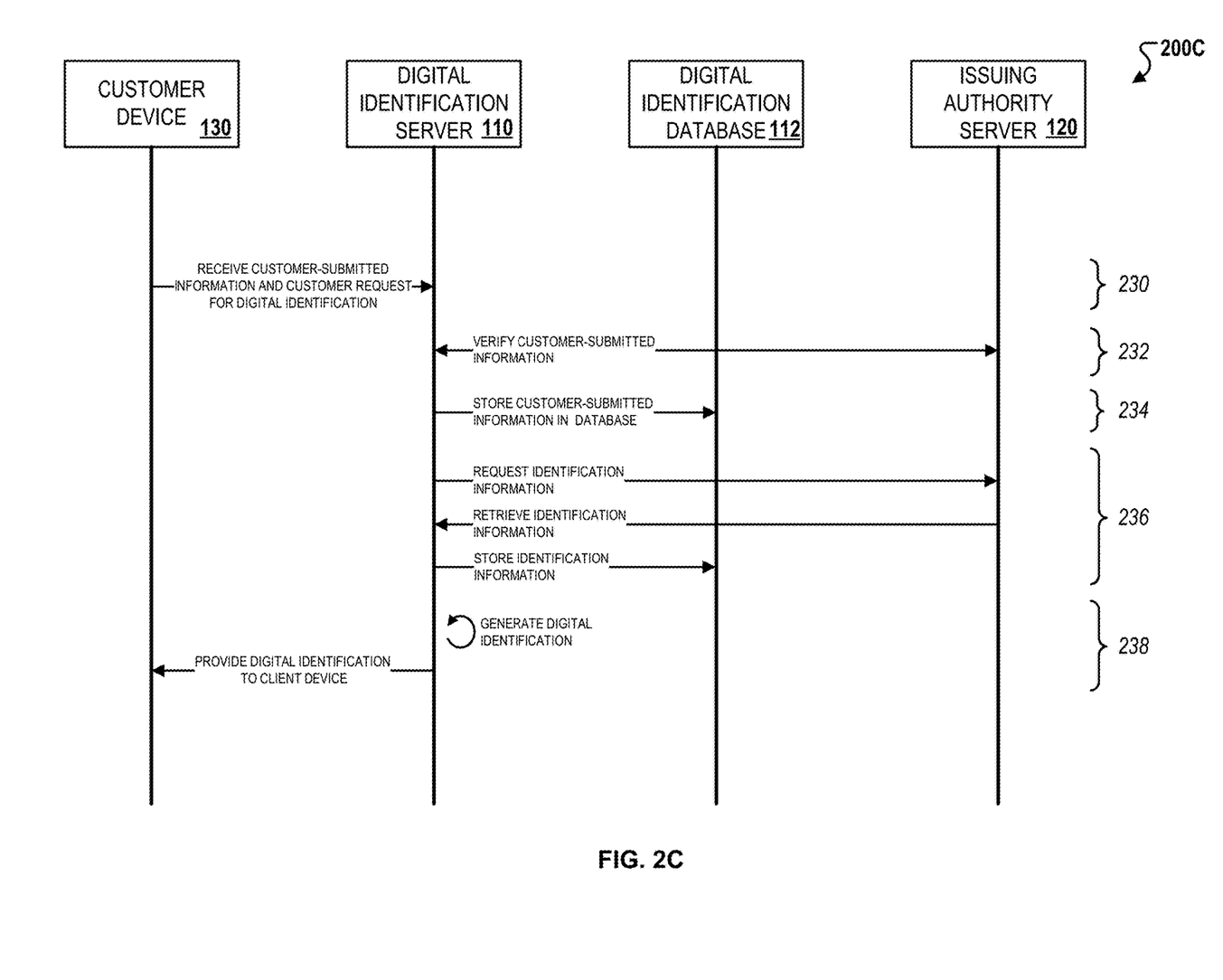

FIGS. 2A-2C are interaction diagram 200A-200C, respectively, of exemplary digital identification enrollment processes. As depicted, the diagram 200A represents interactions between the customer device 130, the digital identification server 110, the digital identification database 112, and the issuing authority server 120, as described in FIG. 1A, during a digital identification enrollment process.

Referring to FIG. 2A, the enrollment process of diagram 200A may initially begin when the digital identification server 110 accesses the digital identification database 112 to retrieve customer information (210). For instance, once a customer opts to enroll into the digital identification program (e.g., through an online signup, or submitting an application), a customer entry may be created in the digital identification database 112 based on the information provided by the customer. The digital identification server 110 may access the digital identification database 112 to extract customer information that includes an email address included in the customer entry.

After retrieving customer information, the digital identification server 110 may send an enrollment request email to the customer device 130 and receive customer-submitted information (212). For instance, the digital identification server 110 may transmit one or more emails to the customer device 130 including requests for customer account information necessary to generate the digital identification 132. For instance, the one or more emails may include, for example, a link to download the digital identification application, or a unique access code assigned to the customer within the customer entry. In response to selecting the link, the customer may be directed to download the digital identification application on the customer device 130. In some instances, the link may be deeplink hyperlink that directs the customer to an application store associated with the operating system of the customer device 130.

In implementations where the one or more emails include the link to download the mobile application, after downloading and installing the mobile application, the customer device 130 may prompt the customer to provide customer information. For instance, the prompted customer information may, enter into a graphical user interface rendered by the mobile application on the customer device 130, information associated with a physical identification card such as, for example, a digital driver license number, an email address, or a unique access code that was previously provided to the customer.

In some implementations, the digital identification server 110 may send the enrollment request to the customer device 130 using other types of messaging techniques such as, for example short message service (SMS). In such implementations, the customer information retrieved from the digital identification database 112 may include a customer phone number, which may be used to send a SMS message to the customer device 130. Additionally or alternatively, the digital identification server 110 may provide notifications through the use of a mobile application installed on the customer device 130.

After receiving the customer-submitted information, the digital identification server 110 may verify the customer-submitted information (214). For instance, the digital identification server 130 may compare the customer-submitted customer information to customer information that is stored in the digital identification database 112. The digital identification server 130 may determine for example, that the names, birthdays, home addresses, access code, etc., match. If the received customer-submitted information matches the customer information stored in the digital identification database 112, then the digital identification server 110 may determine that the customer-submitted information has been verified. Alternatively, if the customer-submitted information does not match the customer information stored in the digital identification database 112, then digital identification server 110 may transmit an additional enrollment request email to the customer.

After verifying the customer-submitted information, the digital identification server 110 may request identification information from the issuing authority server 120 (216). For instance, the digital identification server 110 may query the issuing authority server 120 for information associated with a physical identification card issued by the issuing authority server 120. The identification information may include demographic information and portrait data for the customer that include details related to information displayed on the physical identification card. In some instances where the identification information stored at the issuing authority server 120 has recently been updated (e.g., issuance of a new identification), after retrieving the identification information from the issuing authority server 120, the digital identification server 110 may store the retrieved digital information on the digital identification database 112. In some implementations, the identification information may include biometric information, e.g., fingerprint information, iris information, etc., for the customer or information to embed in a digital identification generated for the customer for authentication purposes.

After retrieving identification information from the issuing authority server 120, the digital identification server 110 may generate the digital identification 132 for the customer and provide the digital identification to the customer device 130 (218). For instance, the digital identification server 110 use the queried information from the issuing authority server 120 to generate a digital form of a physical identification card for the customer. In some implementations, the generated digital identification 132 may be a digital replica of the physical identification card such that the digital identification 132 may be used as a substitute identification. In other implementations, the generated digital identification 132 may include a portion of the identification information such that the digital identification 132 may be used complementarily to the physical identification card. For example, in such implementations, the digital identification 132 may include additional information that may be relevant to the physical identification card.

In some implementations, after generating the digital identification 132, the digital identification server 110 may include one or more security features into the digital identification 132. As described previously, the security features may include visual indicators that are displayed on the digital identification, optically scanning indicators that may be detected by a verification or detector device, or a variable credential associated with the customer. The digital identification 132 may then be provided to the customer device 130 for access by the customer or any other authorized user.

In some implementations, after generating the digital identification 132, the digital identification server 110 may additionally assign a customer access code to the digital identification to restrict access to the digital identification on the customer device 130. For instance, the assigned customer access code may be provided to the customer device 130 as a security configuration associated with the generated digital identification 132 and stored in the digital identification database 112.

Referring now to FIG. 2B, the enrollment process of diagram 200B initially begins when the issuing authority server 120 transmits identification information and an instruction to the digital identification server 110 to generate a digital identification 132 for the customer and the digital identification server 110 stores the identification information on the digital identification database 112 (220). For instance, the identification information may include information related to a vetted customer record on the issuing authority server 120 such as a customer identifier number, e.g., a driver's license number, associated with the customer identification record. The digital identification server 110 may then create a customer entry in the digital identification database 112 using the customer identification information received from the issuing authority server 120.

Transmission of the instruction to the digital identification server 110 may cause the digital identification server 110 to transmit an enrollment request email to the customer device 130 (222). For instance, the digital identification server 110 may transmit one or more emails to the customer device 130 including requests for customer information necessary to generate the digital identification 132 as described previously with respect to step 212 in FIG. 2A. For example, the one or more emails may include a link to download the digital identification application, or a unique access code assigned to the customer within the customer entry. In response to selecting the link, the customer may be directed to download the digital identification application on the customer device 130. In some instances, the link may be deeplink hyperlink that directs the customer to an application store associated with the operating system of the customer device 130. The customer device 130 may provide the customer-submitted information similarly to as described with respect to step 212 in FIG. 2A.

After receiving the customer-submitted information, the digital identification server 110 may verify the customer-submitted information (224). For instance, the digital identification server 130 may compare the customer-submitted customer information to the identification information that is stored in the digital identification database 112.

After verifying the customer-submitted information, the digital identification server 110 may generate the digital identification 132 for the customer and provide the digital identification to the customer device 130 (226). For instance, the digital identification server 110 use the queried information from the issuing authority server 120 to generate a digital form of a physical identification card for the customer as described previously with respect to step 218 in FIG. 2A.

In some implementations, the issuing authority server 120 may initially not provide the digital identification database 112 enough information to generate a digital identification but enough information to send an enrollment request to the customer device 130 and verify customer-submitted identification. For example, the issuing authority server 120 may only provide the digital identification database 112 a name, e-mail, and birthday of a customer. After the customer is verified, the digital identification database 112 may then request additional information from the issuing authority server 120 similarly to as previously described with respect to step 216 in FIG. 2A and the digital identification database 112 may then receive the additional information to generate the digital identification.

Referring now to FIG. 2C, the enrollment process of diagram 200B may initially begin when a customer transmits customer-submitted information and a request for the digital identification 132 to the digital identification server 110 (230). For instance, a customer may initially download a mobile application for the digital identification and request a digital identification through the mobile application. Accordingly, the process 200C may be initiated by the customer using the customer device 130. The request may include customer-submitted information that is used by the digital identification server 110 in a customer verification during the digital identification enrollment process. In some instances, the customer-submitted information may be customer identification information such as, for example, a facial image of the customer. For example, the mobile application may prompt the customer to take a photo of the customer's face using a camera in the customer device 130. The customer identification information may then be verified by the digital identification server 110 against customer information stored on the digital identification database 112. For example, the digital identification server 110 may use facial recognition to verify that photo of the customer received from the customer device 130 matches a photo for the customer stored in the digital identification database 112.

Additionally or alternatively, in some implementations, the customer identification information may include information associated with a physical identification issued by the issuing authority. The customer identification information may include a captured image of a physical identification such as a driver license, a captured image of a QR code associated with the physical identification, or an identifier included in the physical identification. For example, the mobile application may prompt the customer to take a photo of a back of the customer's driver's license including a barcode and a front of a customer's driver's license using a camera in the customer device 130. In such implementations, the information associated with the physical identification may be verified by the digital identification 110 against customer information stored on the issuing authority server 120 and verified for security credentials, e.g., watermarks, types of font, ghost images, etc. For example, the digital identification server 110 may perform optical character recognition on the image of the front of the driver's license to extract a name, birthday, driver's license number, etc. and compare the extracted information to information for the customer from the digital identification database 112.

After receiving the customer submitted information and the customer request for the digital identification 132, the digital identification server 110 may access the issuing authority server 120 to verify customer-submitted information (232). For instance, the digital identification server 110 may compare the customer-submitted customer information to customer information for the customer received from the issuing authority server 120. For example, the digital identification server 130 may determine for example, that the names, birthdays, home addresses, etc., match.

After verifying the customer-submitted information, the digital identification server 110 may store the customer-submitted information on the digital identification database 112 (234). For instance, the digital identification server 110 may create a customer record on the digital identification database 112 that includes the customer-submitted information from the customer device 130.

After storing the customer-submitted information on the digital identification database 112, the digital identification 110 may request identification information from the issuing authority server 120 (236). For instance, the digital identification server 110 may query the issuing authority server 120 for information associated with a physical identification card issued by the issuing authority server 120 as described previously with respect to step 216 in FIG. 2A.

After retrieving identification information from the issuing authority server 120, the digital identification server 110 may generate the digital identification 132 for the customer and provide the digital identification to the customer device 130 (238). For instance, the digital identification server 110 may use the queried information from the issuing authority server 120 to generate a digital form of a physical identification card for the customer as described previously with respect to step 218 in FIG. 2A.

In some implementations, the customer device 130 may provide customer information that includes one or more of a photo of the customer or photos of a physical identification of the customer as described in step 230 additionally or alternatively to providing customer information in step 212 in FIG. 2A and step 222 in FIG. 2B.

Figure 3:
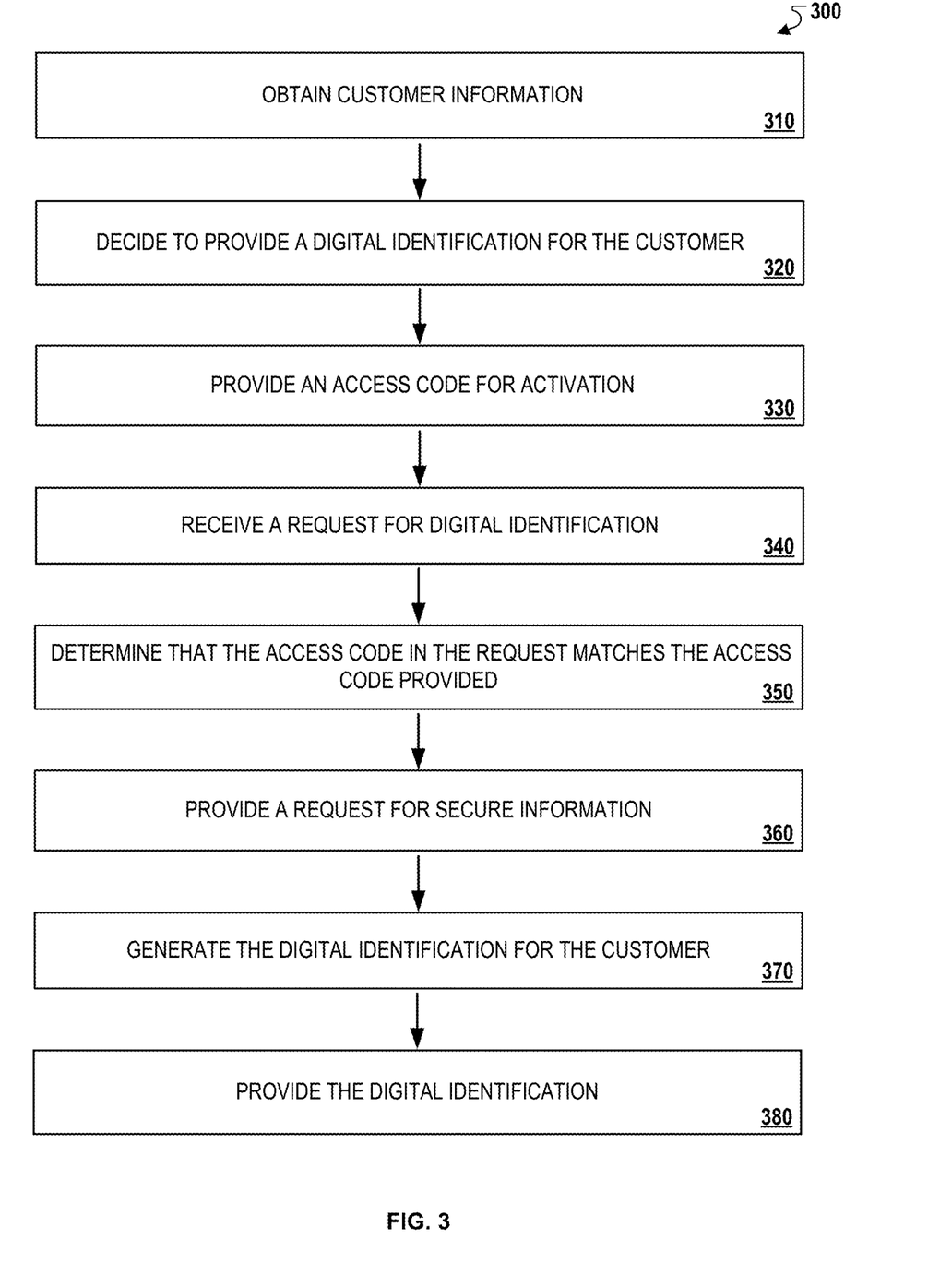
FIG. 3 illustrates a flowchart of an example process of digital identification enrollment and provisioning.

FIG. 3 illustrates an exemplary process 300 of digital identification enrollment. Briefly, the process 300 may include obtaining customer information (310), deciding to provide a digital identification for the customer (320), providing an access code (330), receiving a request for digital identification (340), determining that the access code in the request matches the access code provided (350), providing a request for secure information (360), generating the digital identification for the customer (370), and providing the digital identification (380).

In more detail, the process 300 may include obtaining customer information (310). For instance, the digital identification server 110 may obtain, from the digital identification 112, customer information that describes the customer. As described previously, the customer information may include demographic information, historical information, or other types of information that describe the customer.

The process 300 may include deciding to provide a digital identification for the customer (320). For instance, the digital identification server 110 may determine to provide the digital identification 132 to the customer device 130 associated with the customer. As described previously, this determination may be the result of a customer opting to enroll into a digital identification program based on an online submission, or an enrollment form.

The process 300 may include providing an access code (330). For instance, in response to deciding to provide the digital identification 132 to the customer device 130 associated with the customer, the digital identification server 110 may provide an access code for activation to the customer device 130. Alternatively, in some instances, the digital identification server 110 may provide the access code for activation to the customer device 130 in response to obtaining the customer information from the digital identification database 112.

The process 300 may include receiving a request for digital identification (340). For instance, digital identification server 110 may receive a request from the customer device 130 for the digital identification, where the request includes a customer-submitted access code that describes the user.

The process 300 may include determining that the access code in the request matches the access code provided (350). For instance, the digital identification server 110 may determine that the customer-submitted access code in the received request matches the access code for activation provided to the customer device 130.

The process 300 may include providing a request for secure information (360). For instance, the digital identification server 110 may provide a request, for secure information that describes the customer, to a secure information database on the issuing authority server 120.

The process 300 may include generating the digital identification for the customer (370). For instance, the digital identification server may generate the digital identification 132 for the customer based on the secure information from the issuing authority server 120 and the customer information.

The process 300 may include and providing the digital identification (380). The digital identification server 110 may provide the generated digital identification 132 to the customer device 130.

As described throughout, computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer may include a processor for executing instructions and one or more memories for storing instructions and data. Generally, a computer will also include, or be operatively coupled to communicate with, one or more mass storage devices for storing data files, such devices include magnetic disks, such as internal hard disks and removable disks, magneto-optical disks, and optical disks. Storage devices suitable for tangibly embodying computer program instructions and data include all forms of non-volatile memory, including by way of example semiconductor memory devices, such as EPROM, EEPROM, and flash memory devices, magnetic disks such as internal hard disks and removable disks, magneto-optical disks, and CD-ROM and DVD-ROM disks. The processor and the memory can be supplemented by, or incorporated in, ASICs (application-specific integrated circuits).

To provide for interaction with a user, the systems and techniques described here can be implemented on a computer having a display device (e.g., a CRT (cathode ray tube), LCD (liquid crystal display) monitor, LED (light-emitting diode) or OLED (organic light-emitting diode) monitors) for displaying information to the user and a keyboard and a pointing device (e.g., a mouse or a trackball) by which the user can provide input to the computer. Other kinds of devices can be used to provide for interaction with a user as well, for example, feedback provided to the user can be any form of sensory feedback (e.g., visual feedback, auditory feedback, or tactile feedback), and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention. For example, much of this document has been described with respect to messaging and mapping applications, but other forms of graphical applications may also be addressed, such as interactive program guides, web page navigation and zooming, and other such applications.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:

receiving, by a digital identification server and from an issuing authority server, identification information associated with a customer and an instruction to generate a digital identification for the customer;

in response to receiving the identification information associated with the customer and the instruction to generate the digital identification for the customer, transmitting, by the digital identification server, an enrollment message to a customer device, the enrollment message comprising a request for obtaining customer information;

receiving, by the digital identification server from the customer device, customer information obtained by the customer device, the customer information comprising a first image of the customer obtained using the customer device or an identification database;

validating, by the digital identification server, the customer information received from the customer device by comparing a face of the customer in the first image with a face in a second image included with customer identification information stored in one or more databases;

in response to determining that the face of the customer in the first image matches the face in the second image, generating, by the digital identification server, the digital identification for the customer based, at least in part, on the identification information associated with the customer, the generated digital identification comprising one or more security features configured to be detected by a verification device, the one or more security features controlling which credentials from a plurality of credentials of the customer are to be included in a display of the digital identification based on a time at which the digital identification is accessed for display at the customer device; and transmitting the generated digital identification to the customer device.

2. The method of claim 1, wherein transmitting the enrollment message to the customer device comprises providing, to the customer device, a deeplink that directs the customer to install a digital identification application on the customer device.

3. The method of claim 1, further comprising:
updating credential information of the customer using the customer information received from the customer device;
encrypting the customer information received from the customer device using a random key;
generating the digital identification using the encrypted customer information and the updated credential information of the customer; and
providing the updated credential information and the encrypted customer information to the verification device.

4. The method of claim 1, wherein:
the customer information received from the customer device further comprises one or more of demographic data associated with the customer, biometric data of the customer, an access code, and identification information included on a physical identification card associated with the customer;
the customer identification information stored in the one or more databases comprises one or more of a name, birthday, home address, an access code, biometric data, demographic data, physical identification card, and image data associated with the customer; and
validating the customer information received from the customer device further comprises:
receiving, from the one or more databases, the customer identification information stored in the one or more databases; and
comparing the customer identification information received from the one or more databases with the customer information received from the customer device.

5. The method of claim 1, further comprising:
in response to determining that the face of the customer in the first image matches the face in the second image, transmitting a second enrollment message to the customer device to obtain supplemental customer information.

6. The method of claim 1, further comprising:
in response to determining that the face of the customer in the first image matches the face in the second image, transmitting, to the issuing authority server, a request for secure identification information which includes data indicative of a physical identification card issued for the customer;
receiving, from the issuing authority server, the secure information; and
generating the digital identification based on the secure information, the digital identification including a digital representation of the physical identification card issued to the customer by the issuing authority server and one or more portions of the secure information received from the issuing authority server.

7. The method of claim 1, wherein the one or more security features in the generated digital identification comprise:
a first level of security features comprising features configured to be verifiable by visual display at the customer device, the first level of security features comprising a three-dimensional rotating photo of the customer.

8. The method of claim 7, further comprising:
determining a security status associated with the digital identification;
generating, based on the security status associated with the digital identification, an update for the one or more security features; and
transmitting the update for the one or more security features to the customer device.

9. A system comprising:
one or more computers of a digital identification server; and
one or more non-transitory computer-readable media coupled to the one or more computers having instructions stored thereon, which, when executed by the one or more computers, cause the one or more computers to perform operations comprising:
receiving, from an issuing authority server, identification information associated with a customer and an instruction to generate a digital identification for the customer;
in response to receiving the identification information associated with the customer and the instruction to generate the digital identification for the customer, transmitting an enrollment message to a customer device, the enrollment message comprising a request for obtaining customer information;
receiving, from the customer device, customer information obtained by the customer device, the customer information comprising a first image of the customer obtained using the customer device or an identification database;
validating, by the digital identification server, the customer information received from the customer device by comparing a face of the customer in the first image with a face in a second image included with customer identification information stored in one or more databases;
in response to determining that the face of the customer in the first image matches the face in the second image, generating the digital identification for the customer based, at least in part, on the identification information associated with the customer, the generated digital identification comprising one or more security features configured to be detected by a verification device, the one or more security features controlling which credentials from a plurality of credentials of the customer are to be included in a display of the digital identification based on a time at which the digital identification is accessed for display at the customer device; and
transmitting the generated digital identification to the customer device.

10. The system of claim 9, wherein transmitting the enrollment message to the customer device comprises:
providing, to the customer device, a deeplink that directs the customer to install a digital identification application on the customer device.

11. The system of claim 9, wherein:
the customer information received from the customer device further comprises one or more of demographic data associated with the customer, biometric data of the customer, an access code, and identification information included on a physical identification card associated with the customer;
the customer identification information stored in the one or more databases comprises one or more of a name, birthday, home address, an access code, biometric data, demographic data, physical identification card, and image data associated with the customer; and validating the customer information received from the customer device further comprises:
    receiving, from the one or more databases, the customer identification information stored in the one or more databases; and
    comparing the customer identification information received from the one or more databases with the customer information received from the customer device.

12. The system of claim 9, wherein the operations further comprise:
    in response to determining that the face of the customer in the first image matches the face in the second image, transmitting a second enrollment message to the customer device to obtain supplemental customer information.

13. The system of claim 9, wherein the operations further comprise:
    in response to determining that the face of the customer in the first image matches the face in the second image, transmitting, to the issuing authority server, a request for secure identification information which includes data indicative of a physical identification card issued for the customer;
    receiving, from the issuing authority server, the secure information; and
    generating the digital identification based on the secure information, the digital identification including a digital representation of the physical identification card issued to the customer by the issuing authority server and one or more portions of the secure information received from the issuing authority server.

14. The system of claim 9, wherein the operations further comprise:
    determining a security status associated with the digital identification;
    generating, based on the security status associated with the digital identification, an update for the one or more security features; and
    transmitting the update for the one or more security features to the customer device,
    wherein the one or more security features in the generated digital identification comprise:
        a first level of security features comprising features configured to be verifiable by visual display at the customer device, the first level of security features comprising a three-dimensional rotating photo of the customer.

15. A non-transitory computer storage device encoded with a computer program, the program comprising instructions that when executed by one or more computers in a digital identification server cause the one or more computers to perform operations comprising:
    receiving, from an issuing authority server, identification information associated with a customer and an instruction to generate a digital identification for the customer;
    in response to receiving the identification information associated with the customer and the instruction to generate the digital identification for the customer, transmitting an enrollment message to a customer device, the enrollment message comprising a request for obtaining customer information;
    receiving, from the customer device, customer information obtained by the customer device, the customer information comprising a first image of the customer obtained using the customer device or an identification database;
    validating, by the digital identification server, the customer information received from the customer device by comparing a face of the customer in the first image with a face in a second image included with customer identification information stored in one or more databases;
    in response to determining that the face of the customer in the first image matches the face in the second image, generating the digital identification for the customer based, at least in part, on the identification information associated with the customer, the generated digital identification comprising one or more security features configured to be detected by a verification device, the one or more security features controlling which credentials from a plurality of credentials of the customer are to be included in a display of the digital identification and one or more timings at which based on a time at which the digital identification is accessed for display credentials of the customer are displayed at the customer device; and
    transmitting the generated digital identification to the customer device.

16. The device of claim 15, wherein:
    the customer information received from the customer device further comprises one or more of demographic data associated with the customer, biometric data of the customer, an access code, and identification information included on a physical identification card associated with the customer;
    the customer identification information stored in the one or more databases comprises one or more of a name, birthday, home address, an access code, biometric data, demographic data, physical identification card, and image data associated with the customer; and
    validating the customer information received from the customer device further comprises:
        receiving, from the one or more databases, the customer identification information stored in the one or more databases; and
        comparing the customer identification information received from the one or more databases with the customer information received from the customer device.

17. The device of claim 15, wherein the operations further comprise:
    in response to determining that the face of the customer in the first image matches the face in the second image, transmitting, to the issuing authority server, a request for secure identification information which includes data indicative of a physical identification card issued for the customer;
    receiving, from the issuing authority server, the secure information; and
    generating the digital identification based on the secure information, the digital identification including a digital representation of the physical identification card issued to the customer by the issuing authority server and one or more portions of the secure information received from the issuing authority server.

18. The device of claim 15, wherein:
    the generated digital identification comprises one or more security features configured to be detected by a verification device, the one or more security features controlling credentials of the customer to be included in a display of the digital identification and one or more timings at which the credentials of the customer are displayed at the customer device, the one or more security features in the generated digital identification comprising:
   a first level of security features comprising features configured to be verifiable by visual display at the customer device, the first level of security features comprising a three-dimensional rotating photo of the customer;
   a second level of security features comprising features that are visually imperceptible to humans and are detectable by the verification device; and
   a third level of security features comprising encrypted secure customer information associated with an identification of the customer.

19. The system of claim 14, wherein the one or more security features in the generated digital identification comprise:
   a second level of security features comprising features that are visually imperceptible to humans and are detectable by the verification device; and
   a third level of security features comprising encrypted secure customer information associated with an identification of the customer.

20. The system of claim 14, wherein the one or more security features in the generated digital identification comprise:
   a second level of security features comprising features that are visually imperceptible to humans and are detectable by the verification device; and
   a third level of security features comprising encrypted secure customer information associated with an identification of the customer.

* * * * *